United States Patent
Oudet et al.

(10) Patent No.: US 6,628,032 B1
(45) Date of Patent: Sep. 30, 2003

(54) MOTOR OR GENERATOR TYPE ELECTROMAGNETIC DEVICES

(75) Inventors: Claude Oudet, Besançon (FR); Jean-François Urwyler, Reconviller (CH)

(73) Assignee: MMT S.A., Fribourg (CH)

( * ) Notice: Subject to any disclaimer, the term of this patent is extended or adjusted under 35 U.S.C. 154(b) by 24 days.

(21) Appl. No.: 10/030,854
(22) PCT Filed: Jul. 12, 2000
(86) PCT No.: PCT/CH00/00381
§ 371 (c)(1), (2), (4) Date: Jan. 10, 2002
(87) PCT Pub. No.: WO01/05019
PCT Pub. Date: Jan. 18, 2001

(30) Foreign Application Priority Data

Jul. 12, 1999 (EP) ............................................. 99810614

(51) Int. Cl.$^7$ ............................................. H02K 17/00
(52) U.S. Cl. ............................................. 310/166
(58) Field of Search ............................ 310/166, 218, 310/179, 254, 7

(56) References Cited

U.S. PATENT DOCUMENTS

| | | | | |
|---|---|---|---|---|
| 4,488,069 A | * | 12/1984 | Field, II | 310/114 |
| 4,508,984 A | * | 4/1985 | Guedj et al. | 310/14 |
| 4,516,048 A | * | 5/1985 | Brigham | 310/156.64 |
| 5,844,343 A | * | 12/1998 | Horst | 310/168 |
| 6,097,126 A | * | 8/2000 | Takura | 310/166 |
| 6,194,806 B1 | * | 2/2001 | Suzuki et al. | 310/216 |
| 6,369,481 B1 | * | 4/2002 | Bahn | 310/166 |

FOREIGN PATENT DOCUMENTS

| | | |
|---|---|---|
| EP | 0288050 A | 10/1988 |
| EP | 0581612 A | 2/1994 |

* cited by examiner

*Primary Examiner*—Dang Dinh Le
*Assistant Examiner*—Hanh Nguyen
(74) *Attorney, Agent, or Firm*—Clifford W. Browning; Woodard, Emhardt, Moriarty, McNett & Henry LLP (57) ABSTRACT

An electromagnetic device, specifically a linear or rotary single- or multi-phase motor or generator comprising, for each phase, at least two relatively-movable sets of teeth of soft magnetic material, one set of teeth being associated with the stator and the other with the rotor, the size of the device being such as to enable it to generate a maximum magnetic potential $U_{max}$ of at least $1.7 \times 10^{-4}$ J/$\mu_0$ ampere turns. The width E of the minimum air-gap between teeth of the rotor and of the stator as measured in the direction perpendicular to the degree of freedom is approximately equal to or greater than $0.7\, \mu_0 U_{max}/J$ where $\mu_0$ is the permeability of free space, $U_{max}$ is the maximum generated magnetic potential difference for causing the magnetic field to pass through the air-gap E, and where J is the maximum polarization of the soft magnetic material used for making the teeth.

17 Claims, 7 Drawing Sheets

MOTOR OR GENERATOR TYPE ELECTROMAGNETIC DEVICES

The present invention relates to electromagnetic devices, that is single- or multi-phase generators and motors of unlimited stroke or of limited stroke (actuators), each device comprising, for each phase, at least two relatively-movable sets of teeth of soft magnetic material, one set of teeth being associated with the stator and the other with the moving part that moves with rotary or linear motion (hereinafter "rotor"). Each set of teeth can comprise a plurality of teeth and the number of teeth can be different between the stator and the rotor. In the limit, one or even both sets could have only one tooth.

In many devices of this type, the pitch between the teeth is substantially constant and substantially the same for both sets of teeth. The reluctance opposing the passage of the magnetic field between these sets of teeth, and consequently the permeance which is the inverse of reluctance, varies during displacement. When one end of a stator tooth and one end of a rotor tooth face each other, they define between them an air-gap of minimum width E. In the devices to which the invention applies, the unit displacement dx (cf. FIG. 5) of a rotor tooth is parallel to the tangent to the end of a stator tooth, thus distinguishing such devices from electromagnets where displacement takes place in the minimum air-gap direction.

Rotary or linear motion devices having the above-mentioned characteristics can be motors, actuators, or generators with variable reluctance, that is without a permanent magnet, or motors, actuators, or generators that are hybrid or having "polarized reluctance", that is including at least one permanent magnet in the stator or the rotor.

In its most commonplace rotary versions, the device comprises a rotor that is generally cylindrical in shape, being constituted by at least one coaxial assembly comprising at least one rotor pole piece fixed on a shaft, each pole piece of the rotor presenting a set of teeth formed by radial teeth disposed along its periphery at a uniform pitch. The device also comprises a stator which comprises a magnetic circuit portion of soft magnetic material, which is generally annular in shape being disposed coaxially around the rotor, and constituted by a peripheral portion and a plurality of stator pole pieces. Each stator pole piece is powered by at least one electrical coil and comprises one or more teeth directed radially so as to face the teeth of the rotor. If there are two or more teeth per pole piece, then the teeth of the stator are disposed substantially at the same pitch as the teeth of the rotor, one rotor tooth and one stator tooth placed facing each other defining between them a radial air-gap having a minimum width E. Variants also exist in which the air-gap is axial, or oblique.

Such electromagnetic devices have been known for several tens of years. Hybrid types are in widespread use, particularly in the form of two- or three-phase stepper motors. Descriptions of such devices can be found for example in the book "Stepping motors and their microprocessor controls" by Takashi Kenio and Akira Sugavara, Clarendon Press, Oxford, 1994, 2nd edition, pp. 28 to 36 for variable reluctance motors, pp. 37 to 44 for hybrid motors, or in the Treatise on Electricity of "l'Ecole Polytechnique Fédérale de Lausanne", Vol. IX, entitled "Electromécanique" [Electromechanics], by Marcel Jufer, Presses polytechniques et universitaires romandes, § 11.2.5 "Moteur réluctant à simple circuit" [Single circuit reluctance motor] and § 11.2.11 "Moteur réluctant polarisé" [Polarized reluctance motor]. Linear motion variants correspond to rolling rotary motors out flat and are described, for example, on page 33 of the above-specified work by T. Kenjo and in § 11.13 in the above-cited work by M. Jufer.

Numerous theoretical studies have been done on such devices, cf. in particular the article by Marcel Jufer and Gunter Heine "Hybrid stepper motor torque and inductance characteristics with saturation effects" published in "Incremental Motor Control Systems and Devices (IMCSD) Proceedings", Fifteenth Annual Symposium, 1986, pp. 207–211, and the references cited in that article.

In the traditional design of such devices, it is considered that the width of the air-gap between two facing teeth should be as narrow as possible in the light of the technical constraints that stem from manufacturing tolerances in terms of diameter, concentricity, centering, burring, and other sources of inaccuracy. T. Kenjo states this clearly on page 30 of the above-cited work in its chapter entitled "Air-gap should be as small as possible". That concept has been supported by the theory. The well-known fundamental expression for calculating force or torque in electromagnetism and derived from the expression for the magnetic energy stored in the air-gap, for two sets of teeth in relative displacement with degree of freedom $\alpha$ states that the torque C that is generated will be proportional to:

$$\frac{dA}{d\alpha} U^2$$

where U is the magnetic potential difference applied between the two sets of teeth, and A is the permeance between them. In a variable reluctance motor, this can be constituted by a magnetic potential difference due solely to the ampere-turns generated by one or more coils carrying electric currents, placed in various possible ways, or in a hybrid motor due to the algebraic sum of the magnetic potential difference $U_a$ polarizing the air-gap under the influence of the permanent magnet plus the magnetic potential difference $U_{ni}$ generated by the above-mentioned coil(s).

The derivative of the permeance $dA/d\alpha$ can be developed in the form of a Fourier series, as can the permeance itself:

$$A = a_0 + a_1 \sin(N\alpha) + a_2 \sin(2N\alpha)$$
$$dA/d\alpha = Na_1 \cos(N\alpha) + 2Na_2 \cos(2N\alpha)$$

where N is the number of teeth around the rotor, or if the rotor is incompletely fitted with teeth, the ratio $2\pi/$(angular pitch) of the teeth that exist.

The first term of the derivative of this expression relative to $\alpha$, known as the fundamental term, is $Na_1 \cos(N\alpha)$. In a motor or an actuator for controlling movement, or in a generator from which an accurately sinusoidal voltage is expected, with the number N of teeth being fixed, it is desirable to increase the amplitude $a_1$ of the fundamental and to reduce as much as possible the amplitudes $a_2, a_3, \ldots$ of the harmonics $\cos(2N\alpha), \cos(3N\alpha), \ldots$. The fundamental term of the torque is then given by expression [1]:

$$C = \frac{dA}{d\alpha} U^2 = Na_1 U^2 \cos(N\alpha) \quad [1]$$

It is well known that the term $a_1$ increases with decreasing air-gap. Since the torque C is proportional to this term, it would appear to be logical to select an air-gap that is as small as possible compatible with the manufacturing method.

For a hybrid motor of ordinary size (known as size "23", giving a diameter ≈51 millimeters (mm), length ≈51 mm), the usual minimum air-gap is about 0.07 mm to 0.08 mm, giving rise to severe constraints on manufacturing tolerances and therefore increasing manufacturing costs. In practice, the air-gap E of conventional motors of this size is always ≦0.1 mm.

For such a hybrid motor, the maximum potential difference $U_{max}$ that appears in the above formula for torque is $U_{max}=U_{ni(max)}+U_a$. For the above-mentioned size and under steady conditions, the coil provides a maximum potential $U_{ni(max)}=85$ ampere-turns (At) between teeth, for example. Since the torque due to the current is at a maximum when $U_a \approx U_{ni(max)}$, $U_a$ is also set to be about 85 At, so $U_{max}=170$ At. Ignoring magnetic potential losses in the soft magnetic materials of the stator and of the rotor, the induction B in the air-gap is given by:

$$B = \mu_0 U_{max}/E. \qquad [2]$$

If it is desired to set a limit of B=2 teslas (T) because of saturation of the material of the magnetic circuit, then $E=1.07 \times 10^{-4}$ meters (m). Thus, an air-gap of $7 \times 10^{-4}$ m to $8 \times 10^{-4}$ m leads to the silicon-iron used as the soft magnetic material being slightly saturated. However, when that type of motor is used with a duty ratio of only a small percentage, the ampere-turns could be increased during the short periods of activity, thus making it possible to increase the air-gap so as to remain within the linear region described by equation [2]. However, in conventional devices, this is not done for the reasons mentioned above: it is preferred to maximize the derivative of permeance, and thus to have a small air-gap, and to saturate the magnetic circuit further.

For example, in the above-cited work by M. Jufer at § 11.19.1 giving the characteristics of a rotary reluctance stepper motor of the Warner trademark it can be seen that $E=0.05$ mm and $U_{max}=(14/5)80=224$ At, that is three times the number of ampere-turns that suffice for raising B to 2 T in the $5 \times 10^{-5}$ m air-gap. That does indeed serve to increase peak torque, but above all it generates major distortion in the function $C=f(\alpha)$ which is far from being a sinewave function. This is well illustrated in the work by M. Jufer at § 11.11.7 and FIG. 11.85. In addition, torque is no longer a simple function of current: the term $a_1$ itself becomes a function of $U_{max}$. In many applications this gives rise to severe drawbacks, by increasing the instantaneous modulation of speed and torque ("cogging") due to the current when the motor is supposed to turning at constant speed and delivering constant torque, and by an increase in noise level. This also gives rise to poorer positioning quality in an open loop, particularly when it is necessary to subdivide the steps.

In the light of those drawbacks, an object of the invention is to provide an electromagnetic device which is arranged in such a manner as to enable the manufacturing costs to be reduced significantly and/or to improve the torque characteristics C=f(a) of the device.

In an application to controlling movement whether in an open loop or a closed loop, it is advantageous to provide an electromagnetic device which is such that for each phase it delivers a relationship for torque that remains substantially sinusoisal up to a magnetic potential value that is only slightly below the maximum design potential.

The objects of the invention are achieved by the device of claim 1.

The electromagnetic device of the invention which is of a size that enables a maximum magnetic potential $U_{max}$ to be generated of about $1.7 \times 10^{-4}$ J/$\mu_0$, that is about 270 At if J=2 T, or even more, is characterized in particular in that the width of the minimum air-gap measured perpendicularly to the degree of freedom is selected in such a manner that:

E is approximately equal to or greater than the value of:

$$0.7[1-5 \times 10^{-4}(U_{max}-1.7 \times 10^{-4} J/\mu_0)]\mu_0 U_{max}/J$$

when $$[1-5 \times 10^{-4}(U_{max}-1.7 \times 10^{-4} J/\mu_0)] \geq 0.5$$

or E is approximately equal to or greater than: $0.35 \mu_0 U_{max}/J$ when $$[1-5 \times 10^{-4}(U_{max}-1.7 \times 10^{-4} J/\mu_0)] < 0.5$$

or E is greater than $2 \times 10^{-3}$ m
where:

$\mu_0$ is the permeability of a vacuum;

$U_{max}$ is the maximum magnetic potential difference generated to cause the magnetic field to cross the air-gap E, said potential difference being due:

either to the ampere-turns alone of the coil(s) feeding the air-gap E;

or else to the sum of said ampere-turns plus the magnetic potential difference between the two sets of teeth in the absence of current, due to a permanent magnet ("polarization" potential); and J is the maximum polarization of the soft magnetic material used for making the teeth; J is defined by the usual relationship $B=\mu_0 H+J$ where H is large enough to reach about 99% of the limit value for J, or indeed, when taking consideration of relative permeability $\mu_r$, by the relationship $J=\mu_0(\mu_r-1)H$ (where H is large enough to generate about 99% of the limit value of J). For the laminated silicon-iron commonly used as the soft magnetic material, $J \approx 2$ T.

An in-depth study of the operating conditions of a motor or generator has shown, surprisingly and against the general tendency seeking to reduce air-gap size, that in order to optimize a motor or a generator when sufficient ampere-turns are available, it is on the contrary advantageous to increase air-gap size, particularly for motors or generators in which the maximum magnetic potential is greater than about $1.7 \times 10^{-4}$ J/$\mu_0$.

In the present invention, it is the product $a_1 U^2$ that appears in the expression [1] that is optimized, contrary to all conventional devices where only the fundamental term $a_1$ of variation in the permeance of the teeth is optimized.

In an electricity generator, e.g. of the polarized variable reluctance type, the voltage is proportional to $d\phi/dt$ or to $d\phi/d\alpha \cdot d\alpha/dt$. The term $d\alpha$ is the angular velocity. The flux is the product of a permeance multiplied by a potential difference; flux variation is proportional to $a_1 U_a$. When the generator is delivering current, the current it delivers increases the potential difference between certain sets of teeth, and the relationship again includes a term in $a_1 U^2$, as for a motor, thus leading to the same conclusions on the topic of the minimum air-gap E.

When the soft magnetic material works with induction that is only 2% greater than its polarization J, then variation in maximum induction B as a function of U as given above by relationship [2] lies in a domain that is substantially linear. It is then possible to replace U in the expression for torque by the value $BE/\mu_0$, which gives:

$$C = \frac{Na_1 B^2 E^2}{\mu_0^2} \cos(N\alpha) \quad [3]$$

It is clear that it is preferable to increase B, which is a squared term, as far as allowed by the soft magnetic material, while remaining within the specified condition whereby B preferably exceeds J by only 2% or less so as to lose only a small portion of $U_{max}$ in the soft magnetic material. The criteria for selecting this material includes, for example, ease of manufacture, cost, and the operating frequency of the device.

In the present invention, it is necessary to determine how the product $a_1 E^2$ varies and not only how $a_1$ varies. The factor $a_1$ is a function of the pitch/air-gap ratio (P/E) of the teeth. This function has been correlated empirically with a power function over a wide domain of variation in P/E. It turns out that for constant pitch P of the rotor teeth (measured along the arc), $a_1$ is substantially proportional to $E^{-1.42}$ and this applies as far as ratios of P/E that are less than 10. As a result, the product $a_1 E^2$, and thus C, most surprisingly, turns out to be proportional to $E^{0.58}$ which is an increasing function. For example, when E is doubled, the term $E^{0.58}$ increases by about 50%. The power 0.58 can vary slightly as a function of the shape of the teeth, but the conclusion remains that the product $a_1 E^2$ is an increasing function of E.

Figure 7:
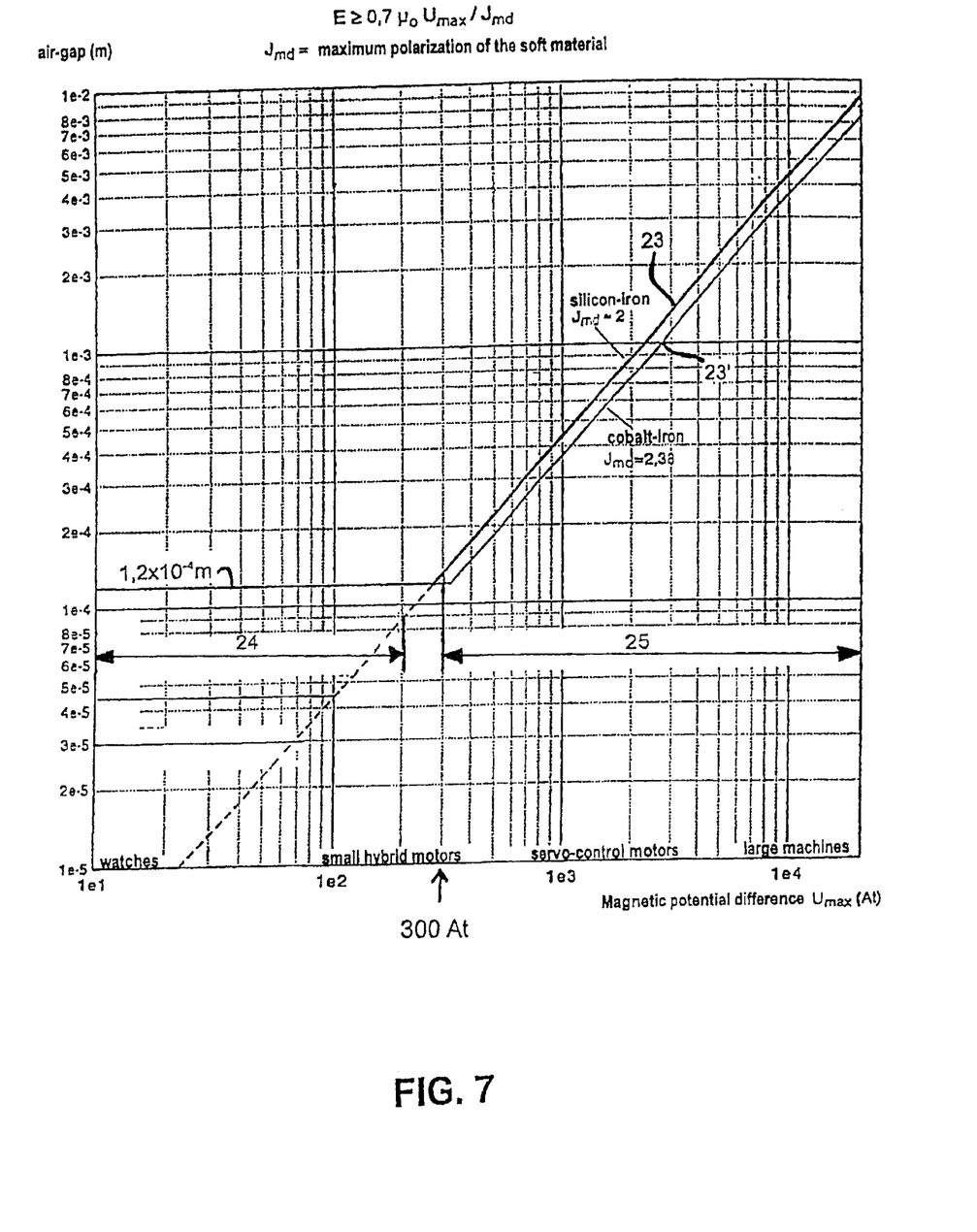
FIG. 7 is a graph showing the optimum relationship between minimum air-gap E and maximum magnetic potential $U_{max}$ in devices of the invention.

In order to be able to benefit from this advantage, it is clear that it must be possible to increase $U_{max}$ with E, as shown in FIG. 7 where the range 25 plots $E=0.7 \mu_0 U_{max}/J$ for two values of J corresponding respectively to a silicon-iron (line 23) of ordinary type, and to one of the best-available materials, namely cobalt iron (line 23'). This value for E thus goes beyond the value which, with small air-gaps, serves to generate induction close to saturation for the soft material used. At low potentials, that is when $U_{max}$ is less than about 114 At for silicon-iron, and as shown in range 24 of FIG. 7, air-gap values of less than $5 \times 10^{-5}$ m apply, corresponding to the practical limits for mechanical embodiment. The air-gap is then determined by considerations other than the above formula, even though the values overlap.

As a result, the invention applies to devices of size greater than about 40 mm to 50 mm in rotary versions. For such devices, $U_{max}$ is greater than $1.2 \times 10^{-4}$ J/0.7 $\mu_0$ approximately, as shown by the range 25 in FIG. 7.

In practice, if very high operating quality in terms of controlling movement is not required, it is possible for example to accept B at the tips of the teeth becoming greater than J by 5%. E is then defined by the formula $\mu_0 U_{max}/1.05J$ if potential drop in the soft material can be tolerated. However, in reality, the potential loss in the soft material is no longer negligible, particularly at the teeth, so the potential difference which remains between the two sets of teeth is only about 84% of $U_{max}$, for example. It is thus possible to define the limit value for E by $0.84 \mu_0 U_{max}/1.05J$, that is $E \leq 0.8 \mu_0 U_{max}/J$. Nevertheless, with certain soft magnetic materials, more ampere-turns are lost at B=1.05J, and it is reasonable to accept a loss of 30% of the potential generated in said soft material without excessively influencing the linearity of torque as a function of applied or generated electrical power (depending on whether the device is a motor or a generator), such that only 70% of $U_{max}$ remains between the teeth, that is $0.7 U_{max}$.

The preferred value for E in accordance with the invention thus obeys the following relationship:

$$E \geq 0.7 \mu_0 U_{max}/J \quad [4]$$

It should be observed that the progress of air-gaps in conventional devices also increases with $U_{max}$ since the increasing size of such devices gives rise to an increase in the tolerances required for manufacture, centering, and the clearance necessary to accommodate thermal expansion. Nevertheless, in conventional devices, attempts are always made to keep the air-gap as small as possible, which means that in conventional machines, air-gaps increase as a function of $U_{max}$ less steeply than in above relationship [4]. It is thus possible to improve existing devices by increasing their air-gaps without thereby reaching the preferred value of $E \geq 0.7 \mu_0 U_{max}/J$.

In this respect, for devices of increasing size, capable of generating high values for $U_{max}$, the length of the soft material magnetic circuit can give rise to losses that increase but that remain acceptable in certain applications (e.g. traction motors), so that it is possible to accept a reduction in the value of the coefficient of $\mu_0 U_{max}/J$. This attenuation coefficient can be defined by the following expression:

$$E \geq 0.7 \mu_0 U_{max}/J$$

where $$k = 1 - 5 \times 10^{-4} (U_{max} - 1.7 \times 10^{-4} J/\mu_0)$$

with the condition that $k \geq 0.5$.

Since air-gaps E in conventional devices do not exceed 1 mm to 2 mm, it is possible to improve the performance of large devices by increasing the air-gap beyond 1 mm to 2 mm, even while remaining below the value given above by relationship [4] as being the optimum value for the air-gap.

It is remarkable that with increasing air-gap and at constant induction in the air-gap, the loss of magnetic potential in the soft materials of the stator and the rotor remains substantially constant. Thus, compared with the total magnetic potential difference $U_{max}$, this loss is reduced, thereby linearizing the characteristic of the device giving torque as a function of applied electrical power. Like the torque, the applied electrical power has a term in $U^2$. Conversely, in prior art devices of the kind cited above (M. Jufer § 11.19.1) potential loss in the soft material can be several times the potential difference that exists between the tips of the teeth. No linearity can be expected between torque and the applied power in conventional devices.

By way of example, in an embodiment concerning a hybrid motor, that is a motor that has a permanent magnet, if the soft magnetic material is a silicon-iron characterized by J=2 T and for which each pole piece of the stator generates 160 At under the effect of the current, $U_a$ must be selected to have a value that is likewise about 160 At, giving $U_{max} \approx 320$ At. The dimensioning rules applied to such a motor leads to a value for E of $1.6 \times 10^{-4}$ m or 0.16 mm, which value is considerably greater than that corresponding to the prior art for movement control devices.

Other characteristics, objects, and advantages of the invention appear from the claims, the description given below, and from the accompanying drawings. By way of example, the drawings show two embodiments of motors of the invention and how they are dimensioned.

Figure 1:
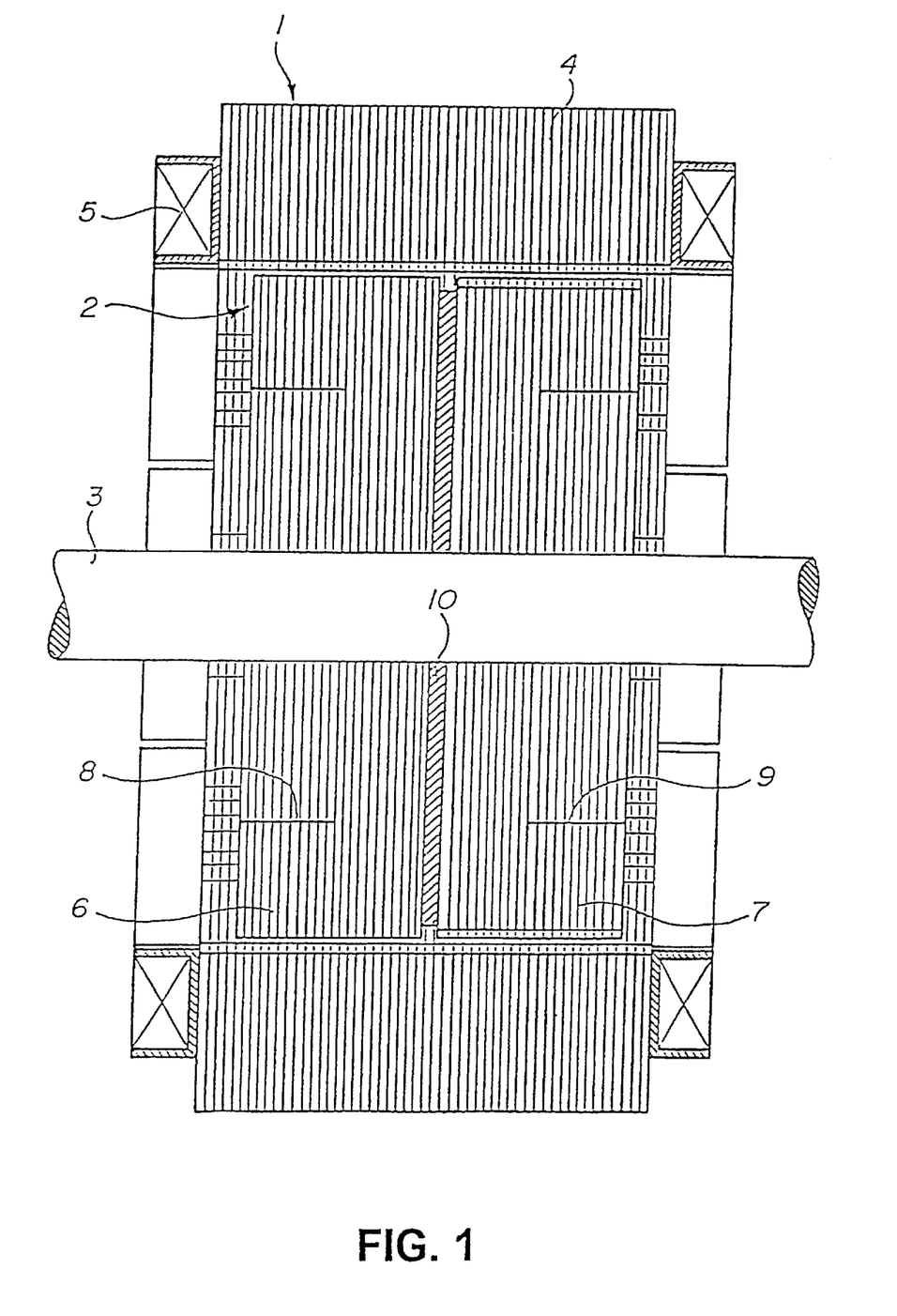
FIG. 1 is an axial section view of a first embodiment of the invention, in particular for a hybrid motor, the section being on line I—I of FIG. 2.

In FIG. 1, the hybrid motor of the invention comprises a stator given overall reference 1 and a rotor 2 mounted on a shaft 3. The shaft 3 is housed in bearings (not shown) supported in a motor casing (likewise not shown) which serves to center the shaft 3 relative to the stator 1.

The stator 1 has a magnetic circuit portion 4 made out of a stack of silicon-iron laminations, for example. Electric coils such as 5 are mounted on the stator in a manner described below. The rotor 2 has two pole pieces 6 and 7 each constituted by a stack of silicon-iron laminations, for example, these pole pieces presenting respective coaxial hollows 8 and 9, in particular to reduce the inertia of the rotor while not affecting its magnetic properties. A permanent magnet in the form of an annular disk 10 is placed between the pole pieces 6 and 7 so as to form an assembly in axial alignment secured to the shaft 3. The magnet 10 is magnetized axially and its thickness in this direction is very small compared with its outside diameter.

Figure 2:
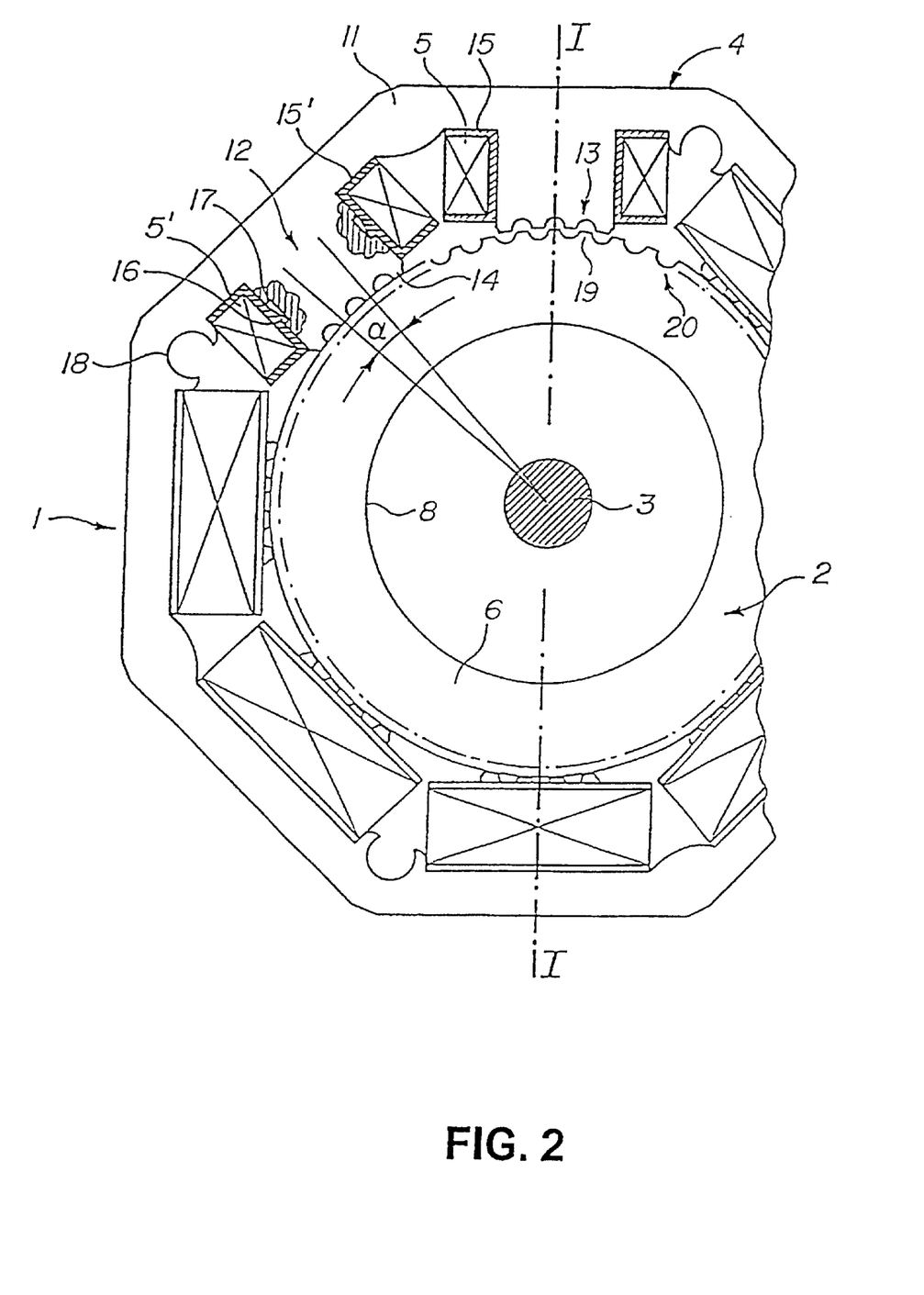
FIG. 2 is an axial face view of the FIG. 1 motor.

FIG. 2 shows the rotor and the stator together when seen in the axial direction. In this figure, the magnetic circuit portion 4 of the stator 1 comprises an essentially annular portion 11 and a plurality of pole pieces such as 12 extending radially towards the inside of the stator. Each of the pole pieces 12 has a body portion and a set of teeth 13 in the form of a plurality of teeth such as 14. Electric coils such as 5, 5', etc. are prefabricated on insulating supports such as 15, 15' and are mounted on the body portions of the corresponding pole pieces. These pole pieces are of uniform length in the axial direction and of uniform length in the radial plane of the motor, such that the coil and insulating support assemblies can be put into place on the pole pieces from the inside of the stator. The insulating supports 15, 15' are somewhat elastic and can be provided on their insides with projecting portions 16 arranged to penetrate into corresponding notches 17 in the flanks of the pole pieces so that the coils are retained on the pole pieces. The shape of these pole pieces, and in particular the lack of any flaring towards the teeth makes it possible to perform assembly in the manner described and avoids any need to wind the coils in situ which would be considerably more complicated and expensive.

The outside shape of the portion 4 shown in FIG. 2 is octagonal in cross-section, the stator having eight pole pieces 12. Such an octagonal shape makes it possible to provide fixing and centering openings or bores 18 in the corners of the polygon so as to avoid weakening the magnetic circuit and avoid any corresponding risk of saturation occurring in a location of reduced section.

Figure 4:
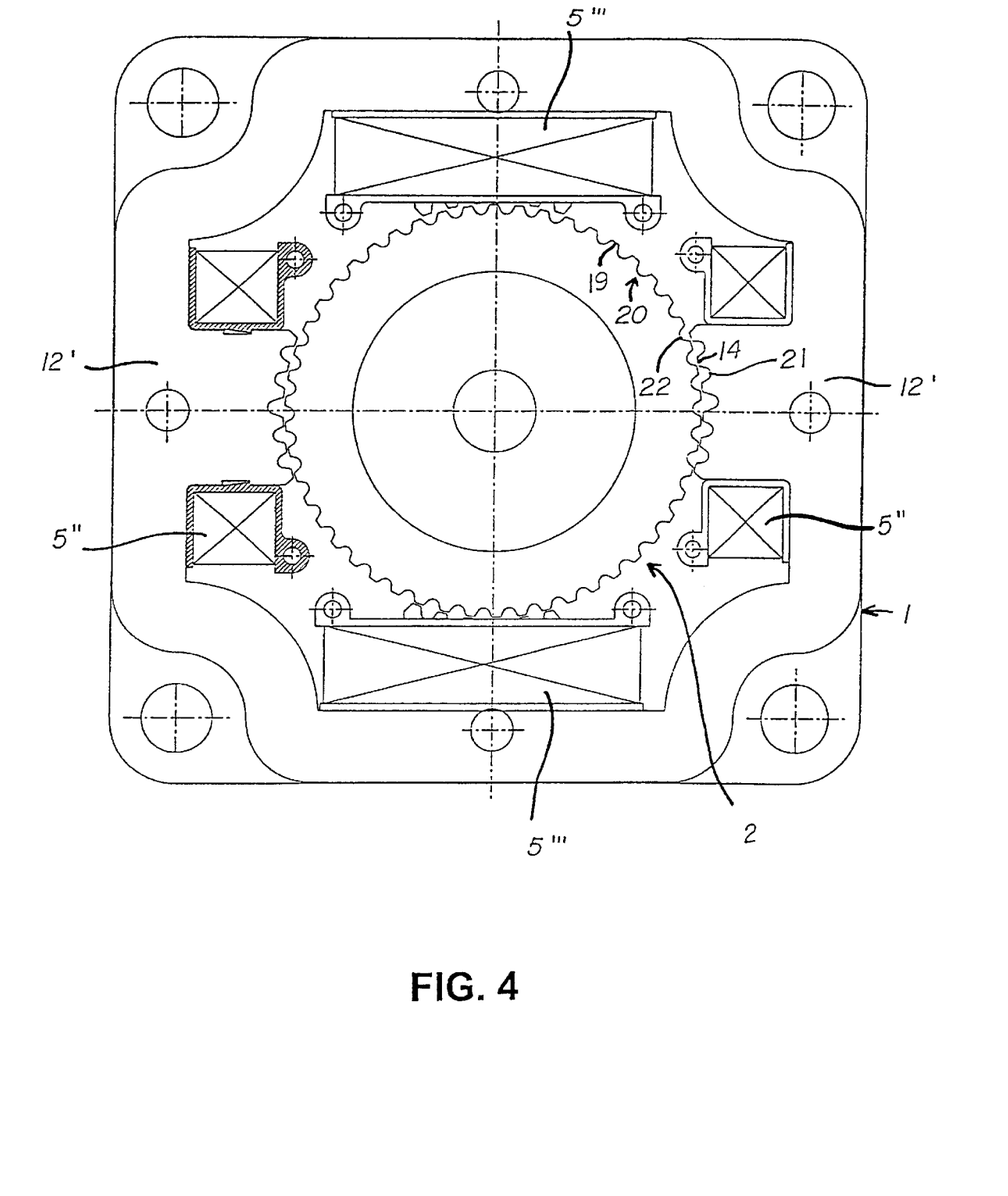
FIG. 4 is an axial face view of a variant of a hybrid motor of the invention.

The hybrid motor of FIG. 4 is very similar to that of FIG. 2, except that it has four pole pieces 12'. The use of two coils 5" and 5''' per phase instead of four as in the embodiment of FIG. 2 makes it possible to apply twice as much electrical power per coil since each coil has more copper. This makes it possible to generate almost twice as many ampere-turns per coil than are possible with the FIG. 2 disposition having eight poles and eight coils.

At its periphery, the rotor 2 has a series of teeth 19 forming a set of teeth 14 at uniform pitch.

Figure 3:
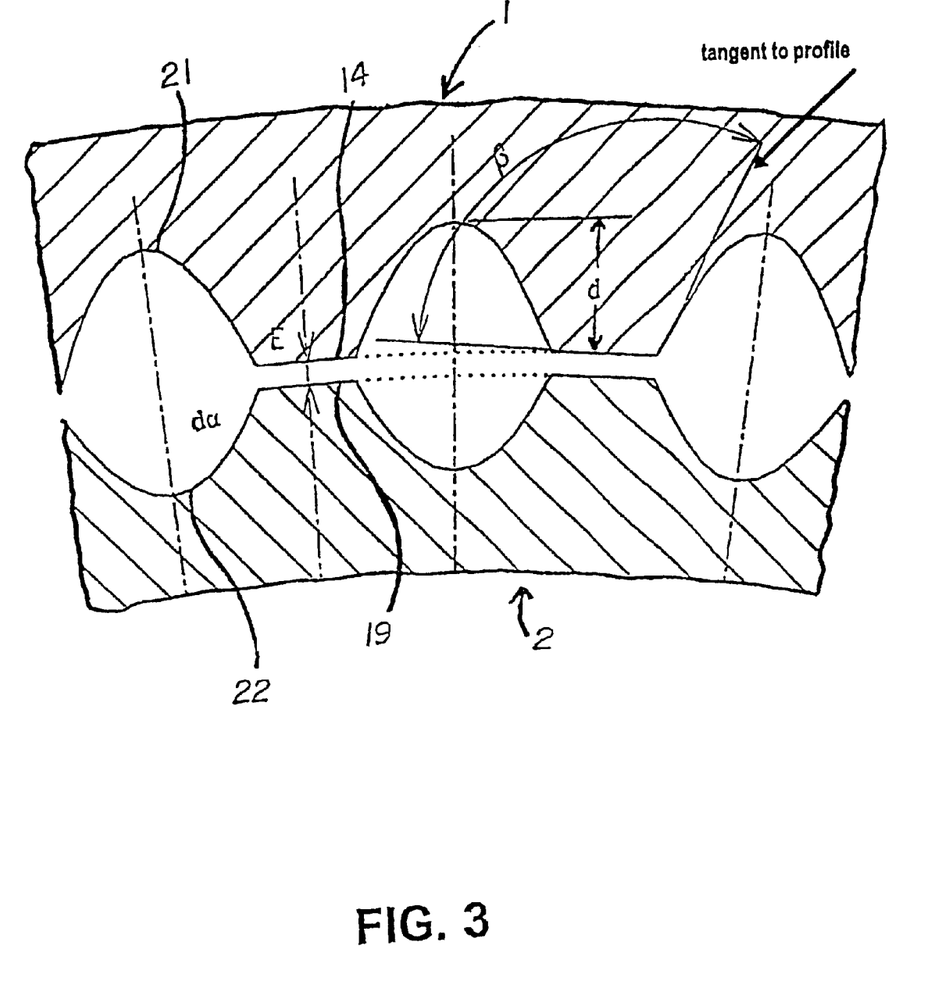
FIG. 3 is a detail view on a larger scale showing a portion of the teeth of a motor of the invention.

FIG. 3 shows a detail of the teeth 20 of the rotor placed facing the teeth 13 of a pole piece of the stator. The shapes and dimensions of the teeth 14 and 19 and of the respective adjacent hollow portions 21 and 22 are similar, even though the stator teeth are associated with deeper hollows than the rotor teeth. Two teeth placed facing each other form between them an air-gap of width E in the radial direction, where the value E is small compared with the height of the teeth. The special feature of the sets of teeth shown in FIG. 3 consists in particular in the shape of the hollows 21, 22 which are preferably essentially parabolic in the radial plane of the motor, with the angle β formed between the tangents to the profiles of the teeth at the corners thereof having a value of about 110°, that is a value lying in the range 95° to 125°, and preferably in the range 105° to 115°. This shape turns out to be particularly advantageous when in the presence of high induction since the loss of potential in the tips of the teeth is significantly reduced while still having good depth (d) for the teeth.

The dimensioning of the air-gap in accordance with the invention depends on the maximum magnetic difference $U_{ni(max)}$ equal to the ampere-turns of the coil(s) feeding the air-gap E. This potential is limited by the maximum current i that the motor can accept either under steady conditions or under low duty-ratio conditions, in which case the magnitude of the current can be a multiple of the maximum current under steady conditions.

In the embodiments of FIGS. 1, 2, and 4 (hybrid motors), the permanent magnet is selected and dimensioned in such a manner as to cause it to generate approximately the same potential difference in the air-gap as is generated by the maximum current, that is $U_a \approx U_{ni(max)}$. The maximum potential difference between facing teeth is thus $U_{(max)} = 2 U_{ni(max)}$.

For the above-mentioned motor using a silicon-iron magnetic circuit characterized by J=2 T and optimized for steady operation, a coil can generate $U_{ni(max)} \approx 160$ At. In applying the above-described relationship $E \geq 0.8\ \mu_0 U_{(max)}/J$, this gives $E \geq 1.61 \times 10^{-4}$ m. It would not be appropriate to take a value much greater than the lower limit, e.g. $2.2 \times 10^{-4}$ m, that is 37% greater, except under circumstances where excellent linearity and a very low distortion content in the torque relationship for each phase is required, since a larger gap is to the detriment of maximum torque. The maximum induction in the air-gap and in the tips of the teeth would be about 1.8 T in the above example.

Nevertheless, it is advantageous to remain in a range of values as defined by the relationship:

$$0.7\mu_0 U_{(max)}/J \leq E \leq 1.1\mu_0 U_{(max)}/J$$

The upper limit is selected empirically so that excellent linearity with loss of maximum torque being less than 30% relative to the lower limit E, given the large reduction in potential losses in the soft material.

It should be observed that since the magnet feeds two air-gaps in series, it must generate a potential of 320 At, which is more than enough to compensate for the various losses in the layers for providing protection against corrosion and in the interstices between the laminations. This can easily be achieved with an NdFeB (neodymium-iron-boron) magnet, which in the example motor shown in FIG. 4, that is two-phase motor having a total of two stator poles per phase, can have thickness of the order of 1.5 mm, working a little below its maximum BH point. This operating point is adjusted by the length of the rotor poles in the axial direction and by the area of the magnet. The minimum air-gap used in the prior art made it difficult to adjust the operating point of the magnet when using a modern magnet of the NdFeB type close to its maximum BH point; there was often a load line characterized by $B/\mu_0 H = -4$ to $-5$. That meant that it was necessary to use a magnet of volume greater than that of the magnet in the present invention (thus costing more).

In motors of the invention, it is advantageous to take steps to reduce the parasitic relaxation torque at $2P \times N$ periods per revolution, where P is the number of phases of the motor and N is the number of teeth of the rotor. This relaxation torque increases with the square of the polarization potential of the air-gap as provided by the magnet, but it also decreases very steeply with increasing air-gap. In order to eliminate it, or at least reduce it where implementation accuracy is not perfect, it is possible in conventional manner to alter the pitch between the teeth in each pole piece of the stator so that the geometrical sum of the vectors representing the $2P^{th}$ harmonic due to each tooth is zero.

If the above motor is optimized to operate for a duty ratio of 25%, then the potentials should be doubled and the recommended air-gap would be 0.32 mm. The rate of increase in mechanical power $C^2/I$, known as "power rate", where I is the moment of inertia of the rotor, would then be more than doubled compared with the prior art which is very surprising given that the smallest possible air-gaps are implemented in the prior art.

In addition to relaxing manufacturing tolerances as compared with ordinary motors or generators, this increase in air-gap width in devices of the invention also makes it possible to obtain numerous advantages in manufacture, such as, for example, the permanent magnet of the rotor can be magnetized while it is outside the stator because of the greater clearance for inserting the rotor into the stator. Such magnetization makes it possible to saturate the magnet better and to avoid permanent deformation due to shock at the instant of in situ magnetization. However, above all, by magnetizing outside the stator, it is possible to make the rotor of a motor out of two assemblies each comprising a magnet and the corresponding pole pieces in the form of an axial succession extending from an outside pole piece, to a first magnet, to two touching central pole pieces, to a second magnet, and to an outside pole piece. Under such circumstances, the magnets can be magnetized in opposite directions, with the central pole pieces having the same polarity, e.g. north, so that the outer pole pieces appear as south poles. This ensures that there is no magnetic leakage between the ends of the rotor and there is no need to separate the central pole pieces magnetically as is the case when magnetizing the rotor in an assembled motor, where the central pole pieces are of opposite polarities.

In the hybrid motor having a four-pole stator and a rotor with N=50 teeth as shown in FIG. 4, dynamic balancing of the magnetic forces is not optimum when the rotor has two pole pieces. With three pole pieces very good balancing is obtained, as explained with reference to the embodiment shown in FIG. 5.

Mention should also be made of the advantage of the invention when it leads to an air-gap that is large enough to enable the laminations constituting the rotor and the stator to be cut out simultaneously. This simplifies manufacture and gives rise to a large saving in material.

Figure 5:
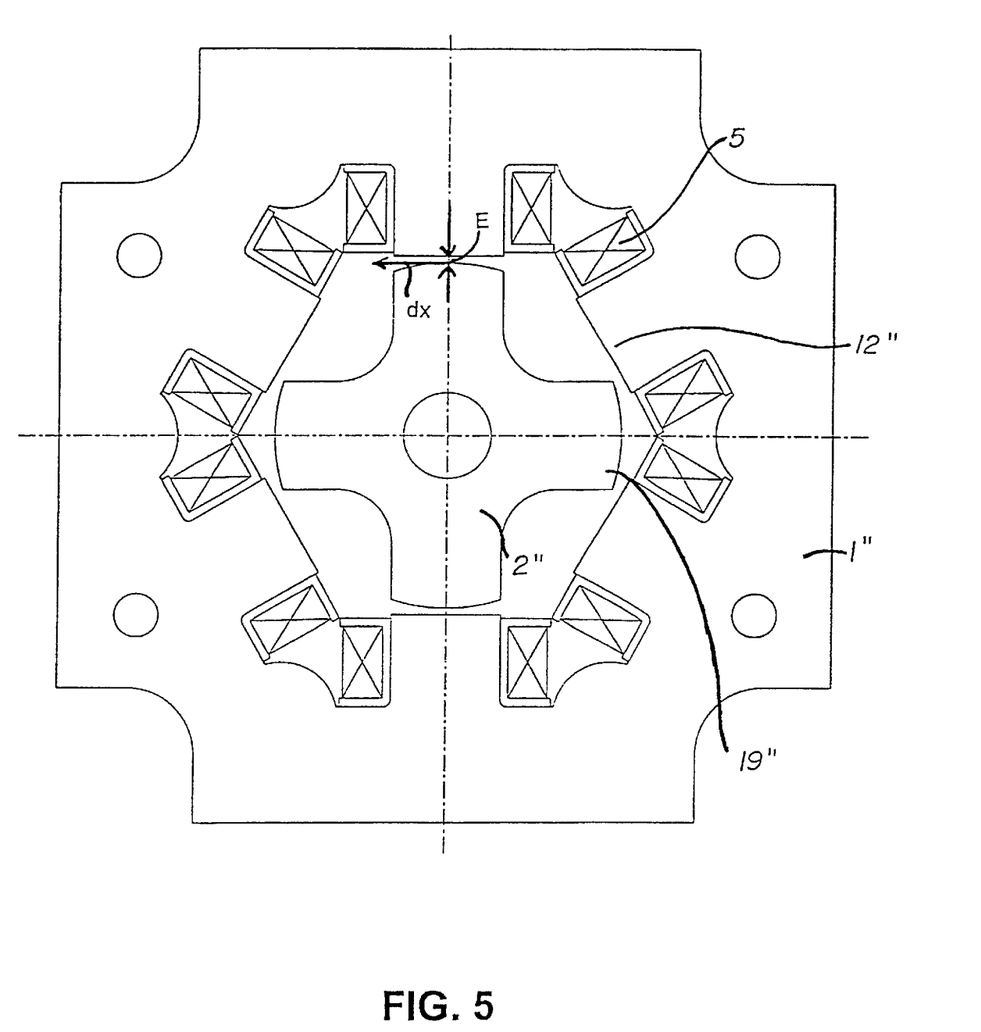
FIG. 5 is an axial face view of another embodiment of the invention, in particular of a variable reluctance motor or generator.

FIG. 5 shows a pure variable reluctance three-phase motor, that is a motor having no magnet for polarizing its teeth, the motor having six pole pieces 12" without teeth on the stator 1', two per phase, and four teeth 19'" on the rotor 2". Interest is increasing again in this type of motor given modern possibilities for electronic control. It is usable with electronic switching and, in the present invention, it can constitute an excellent servo-control motor since it has no relaxation torque and no magnetic losses from the rotor in the absence of current. The moment of inertia of the motor can be much smaller than that of a hybrid motor where the diameter of the rotor is determined by the area of the magnet needed to generate the polarization potential. As is usual with servo-control motors, such a motor is built to accommodate peak currents that are eight to ten times greater than the current that can be accommodated under steady conditions.

If the steady current can generate 150 At per coil 5, then for a motor of the same size as the specific example of a hybrid motor described above, the air-gap must be dimensioned for a maximum potential of at least 1200 At, which means that the air-gap E must be at least 0.6 mm, which is much greater than prior art air-gaps which are about 0.1 mm or less, depending on manufacturing accuracy and other tolerances.

Figure 6:
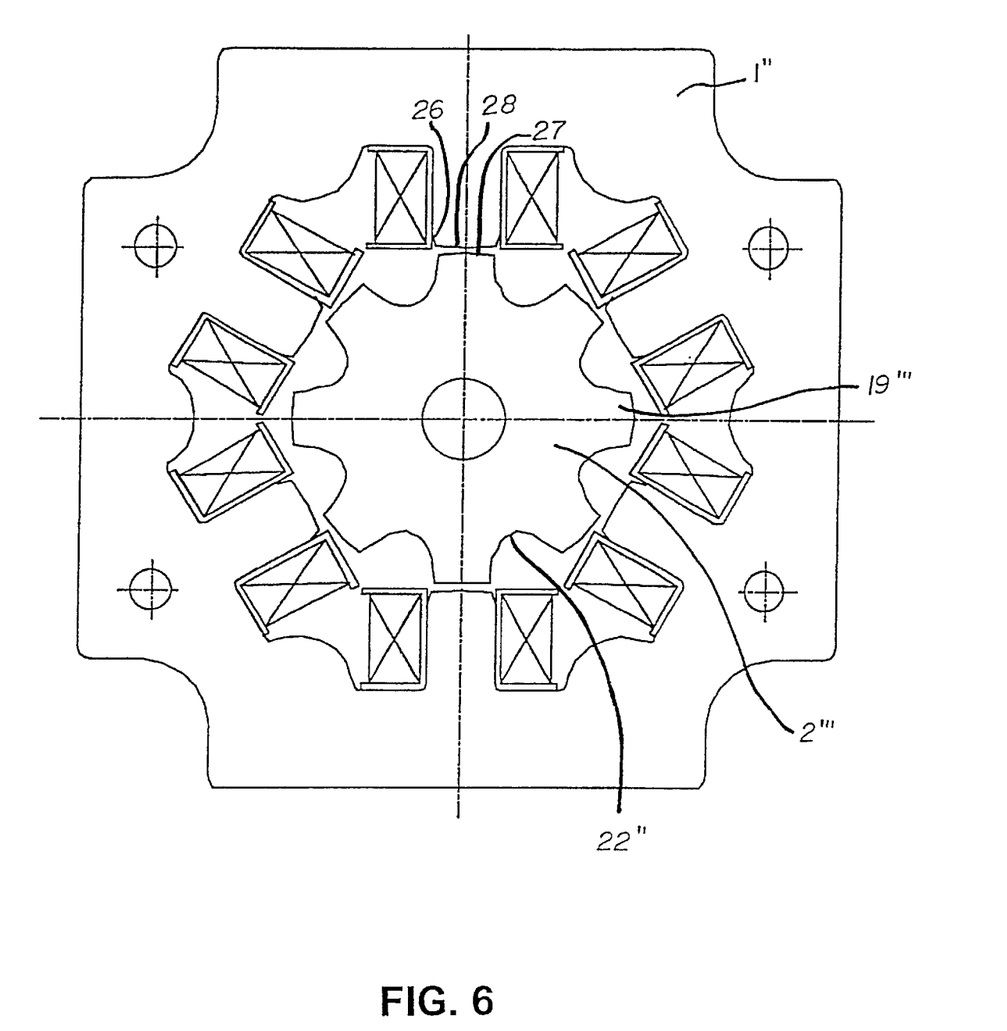
FIG. 6 is an axial face view of a variant variable reluctance motor or generator of the invention.

With only one tooth per stator pole piece and with a constant air-gap, it is difficult to obtain a low harmonic content in the permeance function $A=f(\alpha)$. It is more appropriate, for example, to use a cylindrical rotor co-operating with stator poles having plane ends, as shown in FIG. 5. When two teeth are facing each other, the air-gap E between their tips thus varies slightly between a maximum value on either side of a minimum value lying on the axis of symmetry. Under such circumstances, the air-gap E for use in the claimed dimensioning formula is the minimum air-gap. The variant of FIG. 6 is similar to that of FIG. 5 except that the rotor 2''' has eight teeth 19'''. The hollows 22" between the teeth can advantageously be parabolic in shape, for the same reasons as given above for the teeth shown in FIG. 3. Each pole piece of the rotor has a chamfer 26 at its end so as to reduce induction when going away from the end. The ends 27 of the teeth of the rotor have the same radius as the circle circumscribing the rotor. Each end 28 of the pole piece 12" of the stator is curved with a radius such that when the stator and rotor teeth are facing each other, the air-gap between them varies. In a specific example where the potential $U_{max}$ is 1100 At, the air-gap varies from a minimum E of $5 \times 10^{-4}$ m to about 1.65 E, that is $8.25 \times 10^{-4}$ m so as to obtain a relationship for variation of permeance that includes a very low percentage of harmonics.

The invention can be applied to other motor variants, for example motors having the structures mentioned by T. Kenjo on page 33 FIG. 2.19 (linear motor) and page 34 FIG. 2.22 (two air-gaps in series), without going beyond the ambit of the present invention.

Other possibilities and advantages will appear to the person skilled in the art both concerning manufacture and concerning use of a motor of the invention.

What is claimed is:

1. An electromagnetic device, that is a linear or rotary single- or multi-phase motor or generator, comprising, for each phase, at least two relatively-moveable sets of teeth made of soft magnetic material, one set of teeth being associated with the stator and the other with the rotor, the device being of a size enabling it to generate a maximum magnetic potential $U_{max}$ of about $1.7 \times 10^{-4}$ J/$\mu_0$ ampere turns (At), wherein the width E of the minimum air-gap between teeth of the rotor and of the stator as measured in the direction perpendicular to their degree of freedom is approximately equal to or greater than:

the value $0.7[1-5 \times 10^{-4}(U_{max}-1.7 \times 10^{-4} \text{ J}/\mu_0)]\mu_0 U_{max}/J$ when $[1-5 \times 10^{-4}(U_{max}-1.7 \times 10^{-4} \text{ J}/\mu_0)] \geq 0.5$ or E is approximately equal to or greater than the value $0.35 \mu_0 U_{max}/J$ when [$1-5\times10^{-4}(U_{max}-1.7\times10^{-4} \text{ J}/\mu_0)$]<0.5
or that E is greater than $2\times10^{-3}$ m;

where $\mu_0$ is the permeability of a vacuum, $U_{max}$ is the maximum generated magnetic potential difference for causing the magnetic field to pass through the air-gap E, said potential difference being due either solely to the ampere-turns of the coil(s) feeding the air-gap E, or to the sum of said ampere-turns plus the magnetic potential difference between the two sets of teeth in the absence of currents due to a permanent magnet, and where J is the maximum polarization of the soft magnetic material used for making the teeth.

2. A device according to claim 1, wherein the width E of the air-gap is smaller than or approximately equal to the value $1.1 \mu_0 U_{max}/J$.

3. A device according to claim 1, wherein the width E of the air-gap is greater than $1.2\times10^{-4}$ m.

4. A device according to claim 1, wherein the width E of the air-gap is greater than $1.5\times10^{-4}$ m.

5. A device according to claim 1, wherein hollows (22, 22") between the rotor teeth are essentially of parabolic shape.

6. A device according to claim 5, wherein the angle β formed between the tangents to the profile of the teeth on the corners thereof has a value lying in the range 95° to 120°.

7. A device according to claim 6, wherein the angle β has a value lying in the range 100° to 115°.

8. A device according to claim 1, wherein hollows (21) between the teeth of the stator are essentially of parabolic shape.

9. A device according to claim 8, wherein the angle β formed between the tangents to the profile of the teeth on the corners thereof has a value lying in the range 95° to 120°.

10. A device according to claim 9, wherein the angle β has a value lying in the range 100° to 115°.

11. A device according to claim 1, wherein the pole pieces of the stator (12) are uniform in length in the axial direction, and uniform in width in a radial plane, and wherein the coils (5) are prefabricated coils on insulating supports (15), said coils and pole pieces of the stator being arranged in such a manner as to enable the prefabricated coils to be put into place on said stator pole pieces.

12. A device according to claim 1, wherein the device is a hybrid motor comprising a permanent magnet (10) delivering magnetic potential so that the total magnetic potential difference at the terminals of the air-gap is substantially equal to $0.5 U_{max}$.

13. A device according to claim 12, wherein the rotor (2) is generally cylindrical in shape being constituted by at least one assembly in axial alignment comprising the permanent magnet (10) in the form of an axially-magnetized annular disk, and two magnetically-permeable rotor pole pieces (6, 7) disposed on either side of said disk.

14. A device according to claim 1, wherein the device is a variable reluctance motor or generator.

15. A device according to claim 14, wherein an end (28) of a stator pole piece (12") is curved with a radius such that, when the teeth of the stator and the rotor are facing each other, the air-gap between them is of varying width.

16. A device according to claim 1, wherein the air-gap width E is greater than or essentially equal to the value $0.7 \mu_0 U_{max}/J$.

17. A device according to claim 16, wherein the air-gap width E is greater than or essentially equal to $0.8 \mu_0 U_{max}/J$.

* * * * *